2,993,794
PROCESS FOR PREPARING KERATIN PROTEIN
Raymond J. Moshy, North Tarrytown, N.Y., assignor to General Foods Corporation, White Plains, N.Y., a corporation of Delaware
No Drawing. Filed June 25, 1958, Ser. No. 744,335
15 Claims. (Cl. 99—18)

This invention relates to an improved, edible, soluble keratin protein and the process for preparing such protein from natural sources of keratin.

Heretofore, to applicant's knowledge, no commercially practicable method has been found for preparing substantially non-degraded keratin which is substantially soluble in water and is derived from its natural sources. While solutions of keratin from such sources as poultry feathers, animal hoofs and horns, hair, wool and the like, have heretofore been formed, such solutions have been unsatisfactory for food and other uses, such as film formation, due to the fact that in the course of dissolving the keratin, the product has usually been so degraded or contaminated that it is unsatisfactory for such uses.

To explain, keratins are natural fibrous materials consisting almost entirely of proteins which are insolubilized and hardened by intermolecular cross-linking. Because of their mechanical properties they are referred to as "structure proteins" and occur in the form of feathers, hair, hoofs, nails, horn and wool. The keratins are distinguished by amino acid composition from the other structure proteins, such as silk, fibrin, collagen and muscle proteins. The keratins are simple proteins in the sense that they yield only amino acids upon hydrolysis. They have an unusually high sulfur content virtually all of which is contained in cystine residues. This is generally considered to be the outstanding characteristic of keratins. Cross-linking of peptide chains by the many cystine molecules present results in huge molecules of enormous molecular weight. Whereas the individual peptide chains have molecular weights of the order of 50,000 they may be bound together by disulfide linkages into aggregates having molecular weights of many millions. The binding of the chains also results in a compactness which is sufficiently well ordered to yield X-ray diffraction patterns characteristic of crystals. In practical terms, this combination of molecular density and size confers insolubility and apparent chemical and nutritional inertness upon the native keratins.

Hence, keratins are commonly regarded as being highly insoluble and resistant to the action of chemicals and enzymes. In their native state they are insoluble in water, salt solutions and cold, dilute acids and bases. As a result, they do not give the standard color reactions characteristic of other proteins. This insolubility is the real reason why keratins appear to be unreactive chemically. Actually, they contain numerous possible reactive amino acids and peptide bonds as well as the disulfide linkages, which when dispersed, are capable of the reactions normally exhibited by other proteins.

It is known that substances containing keratin, such as hoof meal, horn meal, nails, hair, feathers and the like are decomposed into amino acids by means of acid or alkaline hydrolysis. For this purpose generally, strong acids are employed, such as hydrochloric acid solutions of 25 to 37 percent, or strong alkalis such as caustic potash or soda solutions of 20 to 25 percent. The acid hydrolysis is a more gentle form of disintegration with respect to the preparation of hydrolyzed products; the alkaline solutions, particularly when employed in a boiling state, effect a strong decomposition, e.g. oxidation, rearrangement of molecules, etc., in these processes. However, the subsequent elimination of the acids and alkalis employed is a matter of particular difficulty. In the employment of caustic potash or soda solutions, the separation of the products of decomposition, chiefly amino acids, from the impurities is almost impossible.

In addition to hydrolysis the keratins may be modified by a reduction reaction. The only easily reducible group in keratin is the disulfide link. Other reducible groups such as the amides, peptides and aromatic rings require vigorous reduction by catalytic hydrogenation or metal hydrides. Besides thioglycollate, which is widely used in hair-waving preparations, other reducing compounds may be used, including mercaptoethanol, sodium formaldehyde sulfoxylate, formamidosulfinic acid and sodium hydrosulfite. By reason of such chemical modification the intermolecular bonds between the keratin molecules are broken; water solubility is not effected; and to effect such solubility, the modified keratin would have to be degraded with acid or alkali with the accompanying difficulties outlined above.

It is an object of this invention to provide an edible keratin protein which is substantially water soluble. It is a further object of this invention to provide a substantially non-degraded keratin protein free of impurities. Other objects will be noted later in the specifications.

It has now been discovered that an edible keratin protein in substantially non-degraded form can be prepared by dissolving natural sources of keratin in a dialkyl sulfoxide wherein the alkyl groups are not of sufficient size to offset effective polarity of the sulfoxide group; preferred among this group of dialkyl sulfoxides is dimethyl sulfoxide; however, other homologs in this series can be used and the present invention is intended to embrace operable homologs wherein the carbon alkyl group ranges from 1 to 6 carbon atoms, which alkyl group may or may not contain polar groupings.

Keratin treated in accordance with the present invention is characterized by a number of novel physical characteristics. In the case of keratin-dialkyl sulfoxide solutions, the keratin is present in a precipitable form such that it may be precipitated with other organic solvents such as ketones, alcohols, ethers, and the like in which keratin is insoluble. In addition, where it is desired to precipitate the dialkyl sulfoxide extracted keratin from the dialkyl sulfoxide solution without the use of organic solvents, water may be employed. In such case, water of sufficient volume and acidity to precipitate all of the protein at its mean isoelectric point is used. By "mean isoelectric point" is meant the pH at which the maximum amount of keratin protein will precipitate although the isoelectric point of keratin protein ranges from pH 4.0 to 6.0. Where it is desired to precipitate only so much of the dialkyl sulfoxide extracted keratin which is water insoluble, then a sufficient quantity of non-acidified water is added to precipitate such fraction. The remaining soluble dialkyl sulfoxide treated keratin is water soluble and may be precipitated after the insoluble precipitate has been removed by acidifying the dialkyl sulfoxide-water solution thereby precipitating the protein at its mean isoelectric point. As an alternative, a miscible organic solvent may be added to the solution of dialkyl sulfoxide-non-acidified water to precipitate the remaining water soluble dialkyl sulfoxide extracted keratin.

Dialkyl sulfoxide dissolved keratin solution may be applied to a flat surface and the keratin contained therein precipitated as a film by the addition of the aforementioned solvents. In addition, the dialkyl sulfoxide dissolved keratin can be extruded through an orifice into a precipitating bath made up of the foregoing solvents; in this bath subsequent chemical reactions may be effected such as hardening with aldehydes such as formaldehyde. In general, another advantage of the dialkyl sulfoxide solution of keratin is that it can be employed to carry out reactions where a non-aqueous or non-reactive medium is required. Furthermore, the solution per se is susceptible to a number of applications where the addition of a liquid foaming agent is desired.

The dialkyl sulfoxide dissolved keratin can be isolated from the aforesaid solution and in this condition has unusually high water solubility, a property which distinguishes it from the isolated keratins of the prior art which either were substantially insoluble or, if soluble, were substantially degraded. The degree of solubility is a function of the time and conditions of extraction with dialkyl sulfoxide. Thus, the water solubility increases as the processing time is increased. In addition, the thus treated keratin has been found to have unusually improved foaming properties, when compared to other edible proteins, to wit, it develops a high foam density, has a rapid rate of foam formation and has a foam which is very stable; in addition, the protein has good surface activity.

As an edible protein, the dialkyl sulfoxide dissolved keratin may be used as a bulk protein filler in meat products, spreads and other proteinaceous foods.

In general, the solubilization of the keratin by treatment with the dialkyl sulfoxide will be carried out at varying elevated temperatures depending upon the source of the keratin. For example, it has been found that in the case of keratin extracted from wool, a dimethyl sulfoxide treatment at temperatures above 100° C. is generally required; say in the order of 125°–190° C., although temperatures of about 155° C. are preferred. On the other hand, in the case of white goose feathers and chicken feather meal, temperatures as low as 85° C. or as high as 190° C. may be employed when dimethyl sulfoxide is used, the preferred range of temperatures being between 127°–155° C. although remarkable changes in the physical properties occur between 100°–115° C. When hoof meal is treated with dimethyl sulfoxide at 155° C. complete solubilization is achieved. However, solubilization is achieved at anywhere from 125° C. and above.

The solubility of the dialkyl sulfoxide extracted keratin in water is substantially greater than the solubility of keratin which has not been extracted with dialkyl sulfoxide. In the case of keratin which has been extracted from hoof meal with dimethyl sulfoxide, the solubility of extracted keratin in water maintained at pH 7.0 is about three to 40 grams and above per 100 ml. of water, whereas the solubility of non-treated hoof meal keratin is less than three grams per 100 ml. of water. Furthermore, in the case of white goose feathers which have been treated with dimethyl sulfoxide the water solubility of the keratin extracted is about 100% in water maintained at pH 7.0, whereas white goose feathers not having been so treated are substantially insoluble. Although keratin proteins of the prior art in some cases have been found to be water soluble, all of these so-called water soluble proteins are severely degraded and are no longer identifiable as proteins as determined by chemical and physical analysis.

Where it is desired to obtain a lighter colored keratin it is necessary to bleach the keratin product. Since keratin is normally solubilized by acid or alkaline treatment before bleaching, the use of dialkyl sulfoxide treated keratin results in considerably better keratin products since there is substantially no appreciable degradation before bleaching. Hence, light colored keratins can be prepared by oxidizing the dialkyl sulfoxide treated keratin with a peroxide solution, preferably hydrogen peroxide at pH 7.0–13.0, although peroxides such as the acyl peroxides, sodium peroxide and other like peroxides may be used. To illustrate, a mixture of dimethyl sulfoxide treated keratin and a 2% peroxide solution is gradually heated to about reflux temperature (105° C.) and maintained at about reflux temperature for 30 to 120 minutes. The oxidized keratin may then be dried by any common drying means or isoelectrically precipitated. Although oxidation of the keratin protein results in some degradation, the degree of degradation is substantially less than in the case of keratins solubilized by alkali or acid hydrolysis, and reduction which cause substantial chemical degradation even prior to oxidation as explained above.

While oxidation of the protein with peroxides is very efficient above pH 11.5, the rate of decomposition of the peroxide is so great as to be impractical. At pH's below 7.0 the protein precipitates as a solid, and therefore any oxidation is heterogeneous and not uniform. Therefore, it is desirable to maintain the pH of the solution during treatment with peroxide at pH 7.0 to 11.5.

The product obtained by the treatment of the present invention has many novel characteristics in addition to being in a precipitable form when in solution with dialkyl sulfoxides. Although substantially non-degraded, it is water soluble to the extent of 3 to at least 40% in water maintained at pH 7.0, the degree of solubility increasing with increasing length of contact with the dialkyl sulfoxide used. The product has a mean isoelectric point of pH 4.5 and is highly digestible. Foam analysis shows that the product is superior to commercially available partially degraded soy protein as a whipping agent, and has a foam sigma value of about 425–475. The following foam analysis demonstrates the comparative static foam sigma values (foam stability values):

| Static Foam | Partially Degraded Soy Protein | Keratin Protein |
| --- | --- | --- |
| Sigma value | 160.67 | 450.98 |

Both the partially degraded soy protein and the keratin protein of the present invention were evaluated at a 0.25% concentration.

The sigma value was determined by the formula of Ross and Clark, Wallerstein Comm., Aug. 1939, No. 6:53 where:

$$\Sigma = \frac{t}{2.303 \log \frac{b+c}{c}}$$

$t$=time in seconds
$b$=volume of solution settling from foam during time $t$
$c$=volume of solution remaining in foam during time $t$ Thus, the higher the sigma value, the more stable the foam. The foam prepared from the product of the present invention is thus almost three times as stable as foams produced from commercial partially degraded soy protein.

The following examples illustrate embodiments of the invention, but it is to be understood that these examples are for purposes of illustration and the invention is not limited thereto since various changes can be made by those skilled in the art without departing from its scope and spirit.

*Example I*

A mixture consisting of 25 g. of white goose feathers and 600 ml. of dimethyl sulfoxide was stirred at 127° C. for 1 hour in a 1-liter, 3-necked flask, equipped with a stirrer, thermometer, and condenser surmounted by a drying tube. Care was taken to avoid local overheating and charring. At the end of the heating period most of the feathers had been dispersed. This mixture was cooled to room temperature and centrifuged. The dispersed keratin was precipitated by the addition of 1800 ml. of acetone to the centrifugate. The precipitate was ground with acetone in a Waring Blendor and dried in a vacuum desiccator. The product was obtained in a yield of 18.1 g., had improved water solubility and was substantially non-degraded. The residue from the centrifugation weighed 7.5 g.

*Example II*

A mixture of 150 g. of white goose feathers and 3 liters of dimethyl sulfoxide was stirred at 110° C. for 2 hours. The mixture was held overnight at room temperature and then heated again at 125° C. for 3 hours. At the end of this heating period most of the feathers had been dispersed. This mixture was cooled to room temperature and centrifuged. The dispersed keratin was precipitated by the addition of acetone, ground in a Waring Blendor and then dried. The product was obtained in a yield of 90 g., had improved water solubility and was substantially non-degraded.

*Example III*

A mixture consisting of 500 g. of white goose feathers in 9 liters of dimethyl sulfoxide was stirred at 150° C. for 4 hours. Care was taken to avoid local overheating and charring. The mixture was cooled to room temperature, centrifuged and then precipitated with acetone. The precipitated protein was then dried. About 100% of the original keratin was recovered in a water soluble, hygroscopic form.

*Example IV*

A slurry consisting of 100 g. of hoof meal and 1000 ml. of dimethyl sulfoxide was heated to 155° C. during 3 hours. The mixture was cooled to room temperature and centrifuged in a Sharples supercentrifuge. The residue weighed 11.8 g. The clear centrifugate was precipitated with ten volumes of water and 47 g. of a substantially non-degraded, hydratable product was obtained.

*Example V*

A slurry consisting of 100 g. of hoof meal and 1000 ml. of dimethyl sulfoxide was heated to 155° C. during 3 hours. The mixture was cooled to room temperature and centrifuged in a Sharples supercentrifuge. The residue weighed 11.8 g. The clear centrifugate was precipitated with five volumes of isopropyl alcohol and then dried. The product was obtained in a 76 g. yield, had improved water solubility and was substantially non-degraded.

*Example VI*

A slurry consisting of 100 g. of hoof meal and 1000 ml. of dimethyl sulfoxide was heated to 155° C. during 3 hours. The mixture was cooled to room temperature and centrifuged in a Sharples supercentrifuge. The residue weighed 11.8 g. The clear centrifugate was precipitated with four volumes of 1,4-dioxane and then dried. The produce was obtained in a 60 g. yield, had improved water solubility and was substantially non-degraded.

*Example VII*

A mixture of 4 g. of white goose feathers in 100 g. of dimethyl sulfoxide was held at 85° to 90° C. for two and one-half hours. At this time virtually all of the feathers had dissolved and the resulting solution was viscous. The small amount of insoluble material was removed and the solubilized goose feathers were precipitated with five volumes of dioxane and dried to yield 2.97 g. of a water soluble, substantially non-degraded product.

*Example VIII*

A mixture of 4 g. of white goose feathers in 100 g. of dimethyl sulfoxide was held at 85° to 90° C. for two and one-half hours. At this time virtually all of the feathers had dissolved and the resulting solution was viscous. The small amount of insoluble material was removed and the solubilized goose feathers were precipitated with five volumes of isopropyl alcohol and dried to yield 3.2 g. of a water soluble, substantially non-degraded product.

*Example IX*

Five hundred ml. dimethyl sulfoxide was heated to 155° C. Fifty g. of hoof meal was added portion wise and the heated mixture held at this temperature for three hours. The insoluble hoof meal was removed by centrifugation and 39.9 g. of solubilized keratin was precipitated with five volumes of acetone from the dimethyl sulfoxide solution. A water soluble, substantially non-degraded product was obtained on drying.

*Example X*

Five hundred ml. dimethyl sulfoxide was heated to 155° C. Fifty g. of hoof meal was added portion wise and the heated mixture was held at temperatures from 127° to 155° C. during 20 minutes and the mixture was held at this temperature for three hours; 38.6 g. of solubilized hoof meal was obtained by precipitation with five volumes of acetone from the dimethyl sulfoxide solution. A water soluble, substantially non-degraded product was obtained on drying.

*Example XI*

Twenty-five grams of dimethyl sulfoxide dispersed keratin was dissolved in 250 ml. water maintained at pH 7.0. Sufficient 30% hydrogen peroxide was added to the solution to give a final concentration of 2% hydrogen peroxide. The solution was heated to reflux in thirty minutes and held at reflux for one hour. The bleached protein was precipitated at its mean isoelectric point, pH 4.5, by the addition of acid, separated and dried. A light colored, bland, water soluble, substantially non-degraded keratin protein was obtained.

While the present invention has been described with particular reference to specific examples, it is not to be limited thereby, but reference is to be had to the appended claims for a definition of its scope.

What is claimed is:

1. A process for extracting edible keratin protein in substantially non-degraded form from keratin sources which comprises solubilizing a keratin source in dialkyl sulfoxide, having 1 to 6 carbon atoms in the alkyl group.

2. A process for extracting edible keratin protein in substantially non-degraded form from keratin sources which comprises solubilizing a keratin source in dimethyl sulfoxide at temperatures of 85° C. to 190° C.

3. The process of claim 2 wherein the keratin source is poultry feathers.

4. The process of claim 2 wherein the keratin source is animal hoof meal.

5. The process of claim 2 wherein the keratin source is wool.

6. A process for extracting edible keratin protein in substantially non-degraded form from white goose feathers which comprises solubilizing said feathers in dimethyl sulfoxide at temperatures of 127° C. to 155° C.

7. A process for extracting edible keratin protein in substantially non-degraded form from hoof meal which comprises solubilizing said hoof meal in dimethyl sulfoxide at temperatures of 155° C. to 190° C.

8. A process for extracting edible keratin protein in substantially non-degraded form from keratin sources which comprises solubilizing a keratin source in dimethyl sulfoxide at temperatures of 85° C. to 190° C., cooling the resultant solution to room temperature, filtering insolubles from said cooled solution, precipitating keratin from said filtered solution by the addition of a dimethyl sulfoxide miscible solvent, and drying said precipitated keratin.

9. A process for extracting edible keratin protein in substantially non-degraded form from keratin sources which comprises solubilizing a keratin source in dimethyl sulfoxide at temperatures of 85° C. to 190° C., cooling the resultant solution to room temperature, filtering insolubles from said cooled solution, precipitating the non-water soluble keratin fraction from said filtered solution by the addition of non-acidified water, removing said non-water soluble keratin fraction from solution, acidifying said solution thereby precipitating the water soluble keratin fraction at its mean isoelectric point, removing said precipitated water soluble fraction from solution and drying said fractions.

10. A process for extracting edible keratin protein in substantially non-degraded form from keratin sources which comprises solubilizing a keratin source in dimethyl sulfoxide at temperatures of 85° C. to 190° C., cooling the resultant solution to room temperature, filtering insolubles from said cooled solution, precipitating the non-water soluble keratin fraction from said filtered solution by the addition of non-acidified water, removing said non-water soluble keratin fraction from solution, adding an organic solvent miscible in a dimethyl sulfoxide-water solution thereby precipitating the water soluble keratin.

11. A process for extracting edible keratin protein in substantially non-degraded form from keratin sources which comprises solubilizing a keratin source in dimethyl sulfoxide at temperatures of 85° C. to 190° C., cooling the resultant solution to room temperature, filtering insolubles from said cooled solution, precipitating keratin from said filtered solution by the addition of a dimethyl sulfoxide miscible solvent, drying said precipitated keratin, dispersing the dried keratin, adding a peroxide to said dispersion, heating the mixture of dispersed keratin and a peroxide solution to elevated temperatures and then drying the mixture.

12. The process of claim 11 wherein the peroxide is hydrogen peroxide.

13. A process for extracting edible keratin protein in substantially non-degraded form from keratin sources which comprises solubilizing a keratin source in dimethyl sulfoxide at temperatures of 85° C. to 190° C., cooling the resultant solution to room temperature, filtering insolubles from said cooled solution, precipitating keratin from said filtered solution by the addition of a dimethyl sulfoxide miscible solvent, drying said precipitated keratin, dispersing the dried keratin, adding a peroxide to said dispersion, heating the mixture of dispersed keratin and a peroxide solution to elevated temperatures, precipitating the protein at its mean isoelectric point and drying said precipitated protein.

14. A process for extracting edible keratin protein in substantially non-degraded form from keratin sources which comprises solubilizing a keratin source in dimethyl sulfoxide at temperatures of 85° C. to 190° C., cooling the resultant solution to room temperature, filtering insolubles from said cooled solution, precipitating keratin from said filtered solution by the addition of a dimethyl sulfoxide miscible solvent, removing said precipitated keratin from the solvent, dispersing said precipitated keratin in an aqueous solution having a pH of 6.5 to 13.0, and mixing a peroxide solution with said protein dispersion while maintaining said mixture at elevated temperatures which are gradually increased to 105° C.

15. A process for extracting edible keratin protein in substantially non-degraded form from keratin sources which comprises solubilizing a keratin source in dimethyl sulfoxide at temperatures of 85° C. to 190° C., cooling the resultant solution to room temperature, filtering insolubles from said cooled solution, precipitating keratin from said filtered solution by the addition of a dimethyl sulfoxide miscible solvent, removing said precipitated keratin from the solvent, dispersing said precipitated keratin in an aqueous solution having a pH of 7.5 to 11.5, and mixing a peroxide solution with said protein dispersion while maintaining said mixture at elevated temperatures which are gradually increased to 105° C. during oxidation of said keratin by said peroxide solution.

References Cited in the file of this patent

UNITED STATES PATENTS 1,921,398    Sturm _____ Aug. 8, 1933

OTHER REFERENCES

Anson et al.: Adv. in Protein Chemistry, vol. 9, pp. 272–3 (1954).